United States Patent [19]

Pujol et al.

[11] Patent Number: 4,990,172
[45] Date of Patent: Feb. 5, 1991

[54] AUTOMATIC MACHINE FOR MOULDING GLASS ARTICLES

[75] Inventors: Gilbert D. Pujol, Dammarie Leslys; Ian F. Rae, Avon, both of France

[73] Assignee: Corning Incorporated, Corning, N.Y.

[21] Appl. No.: 496,364

[22] Filed: Mar. 20, 1990

[30] Foreign Application Priority Data

Mar. 21, 1989 [FR] France ............................ 89 03667

[51] Int. Cl.⁵ ............................................ C03B 11/12
[52] U.S. Cl. ...................................... 65/319; 65/356
[58] Field of Search ................. 65/308, 310, 312, 319, 65/356

[56] References Cited

U.S. PATENT DOCUMENTS

| | | | |
|---|---|---|---|
| 2,398,676 | 4/1946 | Snyder et al. | 65/312 |
| 3,244,497 | 4/1966 | Copeland | 65/308 X |
| 3,598,558 | 8/1971 | Ayers | 65/319 X |
| 4,555,258 | 11/1985 | Curiel | 65/319 |

Primary Examiner—Robert L. Lindsay
Attorney, Agent, or Firm—Clinton S. Janes, Jr.

[57] ABSTRACT

The invention relates to the moulding of glass articles. It concerns an automatic machine for moulding glass articles by means of pressing, comprising a single split mould (1), means for opening and closing the mould, means (9, 10) for introducing a metered batch of molten glass into the said mould, pressing means (12) in order to shape the batch of molten glass introduced into the said mould, and means for taking away the shaped glass article, characterized in that the mould has means (16) for periodically cooling using a pulse of cooling fluid, and in that it additionally comprises a plurality of mould bases (13) capable of being brought successively into a position in which they complete the said mould, the said mould bases additionally serving to take away the still malleable glass article having just been moulded.

2 Claims, 3 Drawing Sheets

AUTOMATIC MACHINE FOR MOULDING GLASS ARTICLES

BACKGROUND OF THE INVENTION

The invention relates to an automatic machine for moulding glass articles, such as cups, by means of pressing.

The automatic machines for moulding glass articles by means of pressing which are currently in use usually comprise a station for delivering a gob of glass, a pressing station, and a periodically rotating turntable supporting a plurality of two-part moulds distributed on its periphery, it being possible for the two parts of a given mould to be brought into contact with each other (closed position) or to be separated from each other (open position). A given mould, in the closed position, receives a gob of glass with a weight determined at the delivery station and is then brought to the pressing station where an appropriately shaped plunger is lowered into the mould and shapes the gob of glass to the form of the mould and is then raised so as to free it from the mould. The mould containing the article moulded by means of pressing is subsequently moved by the turntable to the next position where an air-blowing pipe blows air into the moulded article contained in the mould for the purpose of cooling the said article. When the mould, which continues to revolve, arrives at a certain position in which the article is considered to be sufficiently cool to be rigid, the mould is opened and a gripping member grasps the article and directs it to a station for completion of its cooling. A machine of this type normally produces 30 to 40 articles per minute.

The number of moulds present on the turntable may vary from one machine to the other, but is typically 12 to 18 moulds.

These moulds, in particular those for moulding glass, including glass convertible into glass-ceramics, the melting range of which is around 1100° C. or higher, are damaged relatively quickly, hence the frequent need to repair or even replace them. Besides the interruptions in the machine's operation, these repairs and replacements are costly in view of the large number of moulds employed.

Another disadvantage of these multi-mould rotating automatic machines is that it is impossible, in practice, to effect rapid cooling of the moulds and the moulded articles contained therein by circulating water, owing to the rotating nature of the machine, so that they can be cooled only by air cooling, which is less efficient and results in a limited production rate.

SUMMARY OF THE INVENTION

The object of the invention is to provide an automatic machine for moulding glass articles by means of pressing, having a single split mould, which is free from the above-mentioned disadvantages.

More particularly, the invention relates to an automatic machine for moulding glass articles by means of pressing, comprising a single split mould, means for opening and closing the mould, means for introducing a metered batch of molten glass into the said mould when the latter is in the closed position, pressing means in order to shape the batch of molten glass introduced into the said mould to the form of the said mould, and means for taking the shaped glass article away from the mould after opening of the latter, characterized in that the mould has two main parts capable of being brought into a closed or open position and intended to shape, in cooperation with the pressing means, the article to be moulded, with the exception of the base thereof, and means for periodically cooling the said main parts, at least at certain locations thereof, using a pulse of cooling fluid, and in that it additionally comprises a plurality of mould bases capable of being brought successively into a position in which they complete the said mould after the said main parts have been brought into the closed position, the said mould bases additionally serving to take away the still malleable glass article having just been moulded, after opening of the mould, and to support the said glass article until it has reached a degree of cooling such that it can be manipulated without risk of deformation.

According to a particular embodiment, the cooling by circulation of cooling fluid, for example water, is completed by air cooling means capable of blowing air into the cavity of the moulded article after opening of the mould.

The machine of the invention makes it possible to mould articles such as cups, bowls, dishes, pots, etc., and may be employed with all types of glass, in particular glass convertible into glass-ceramics, suitable for moulding by means of pressing.

DESCRIPTION OF THE INVENTION

The description which follows, given with reference to the accompanying drawings, will elucidate the invention.

Figure 1:
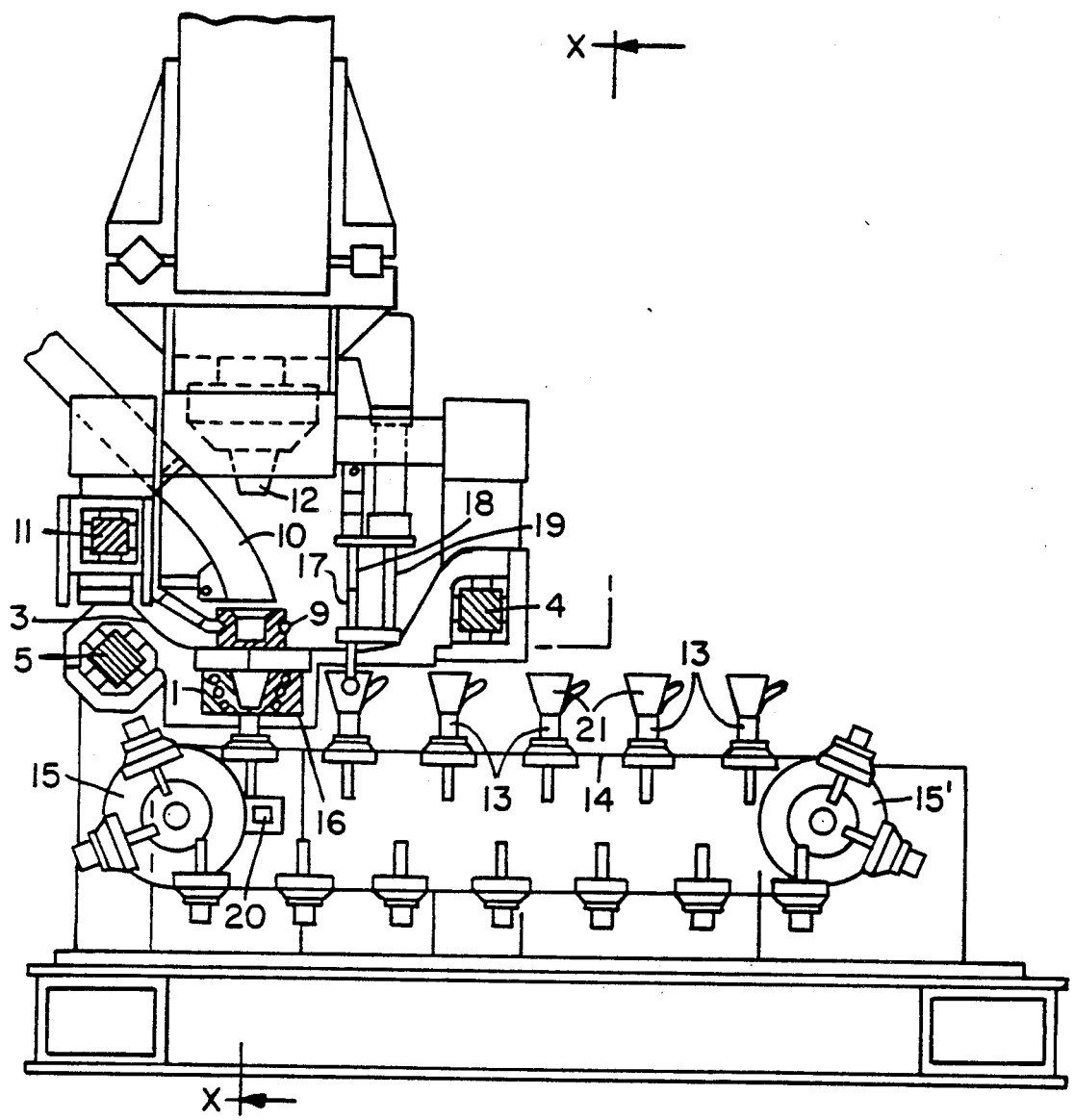
FIG. 1 is a diagrammatic view, in longitudinal axial section, of a machine according to the invention.
Figure 2:
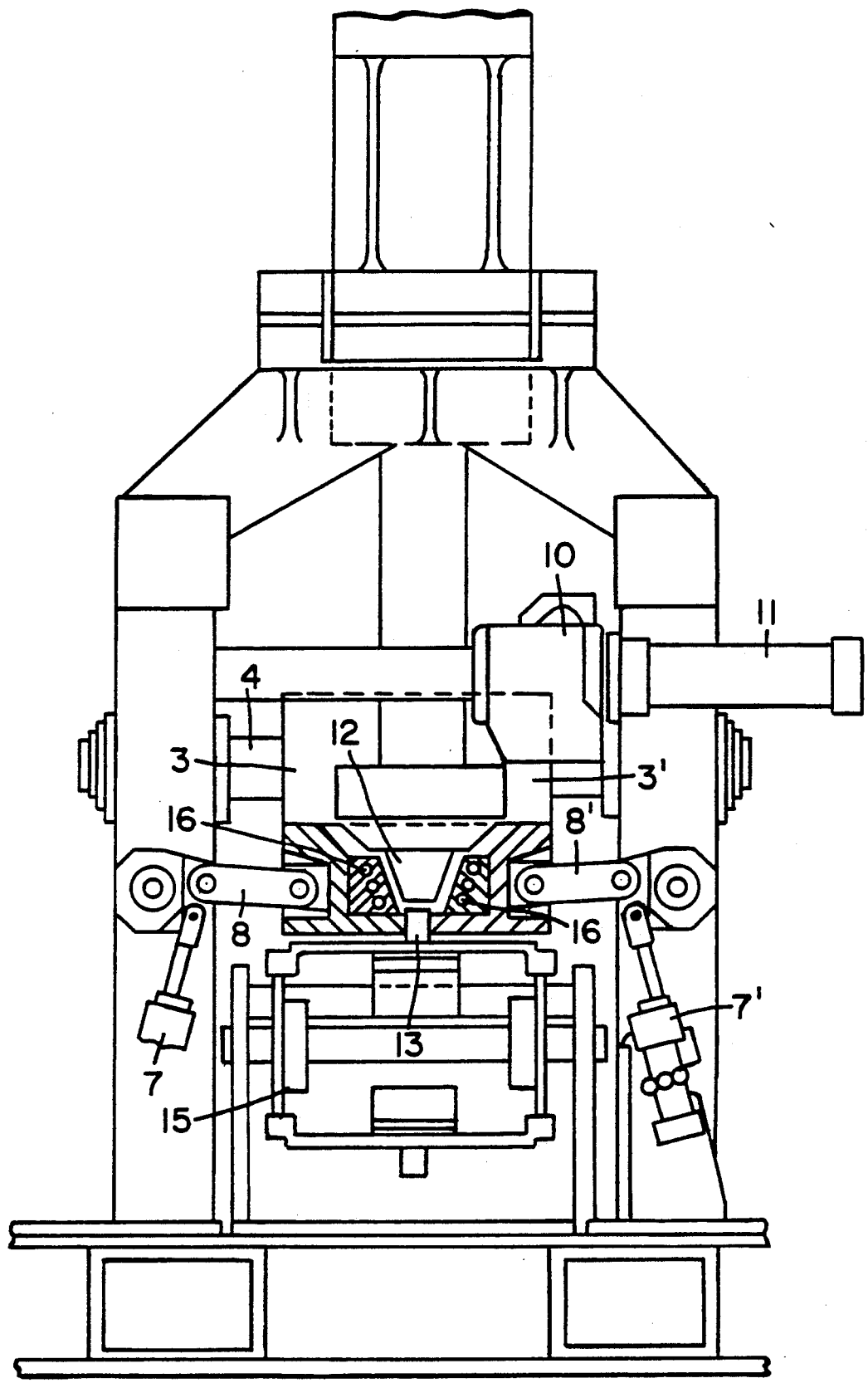
FIGS. 2 and 3 are diagrammatic views, in cross-section along the line X—X of FIG. 1, towards the right, showing the mould in the closed position and in the open position, respectively.
Figure 3:
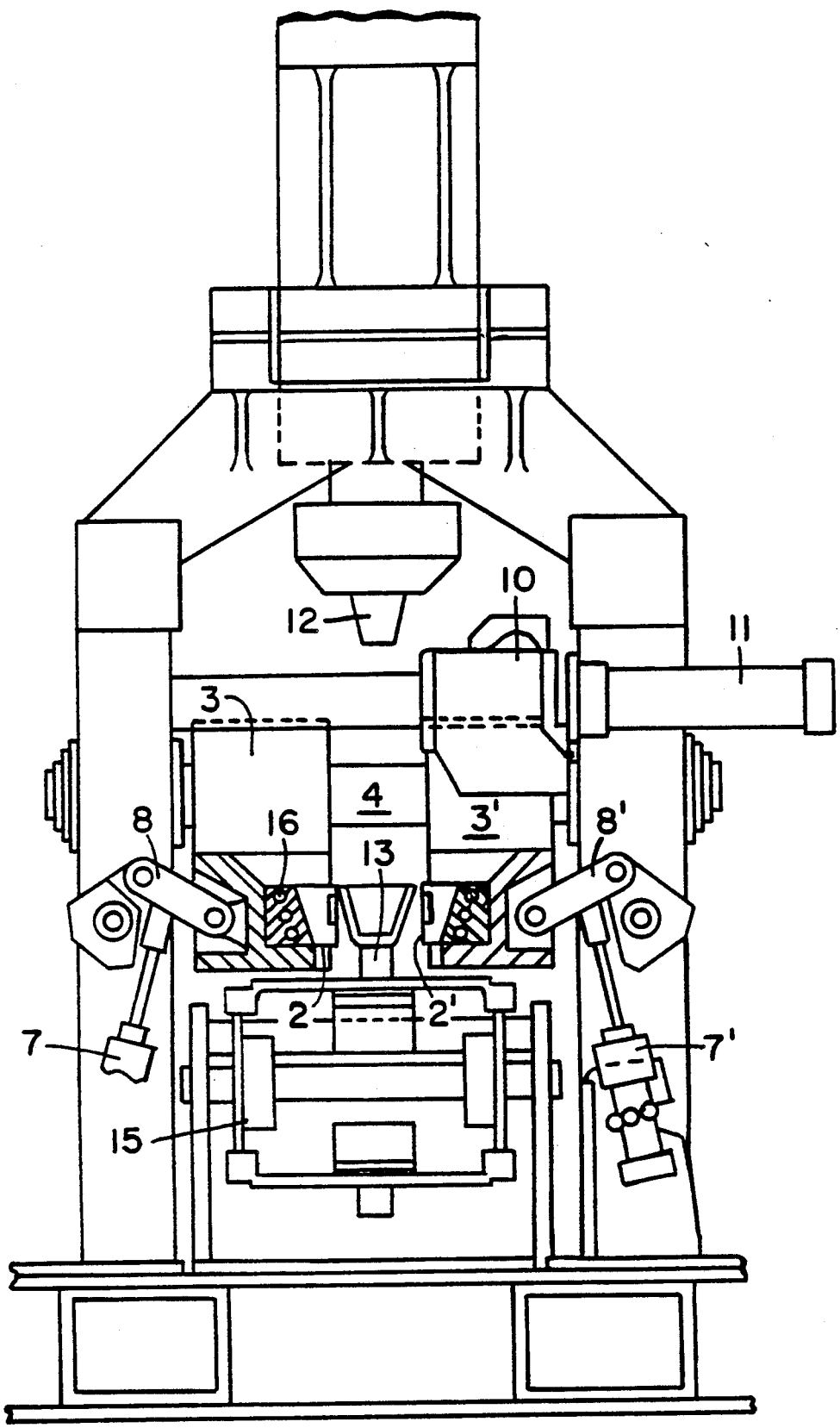

In the accompanying drawings:

FIGS. 1 to 3 illustrate a machine according to the invention intended for moulding cups by means of pressing. This machine comprises a split mould 1 composed of two main parts 2 and 2', each integral with a support 3 and 3', respectively, and each mounted slidably on guides 4 and 5, the guides 4 and 5 being integral with the frame 6 of the machine. The main parts 2 and 2' can be brought into contact with each other (closed position of the mould) or separated from each other (open position of the mould) by cylinder 7 and 7' and articulated connecting rod 8 and 8' mechanisms. The main parts 2 and 2' serve to shape the article to be moulded, except the base thereof, and have an opening at their bottom parts. The machine also comprises a funnel 9 cooperating with a deflector chute 10 serving to deliver a gob of glass of given weight into the mould 1. The funnel 9 and the deflector chute 10 are arranged one extending from the other, and are mounted slidably on a guide 11. An automatic mechanism (not shown) enables the funnel/deflector chute assembly to be brought directly above the mould 1 or to be retracted towards the rear of the plane of the drawing. The deflector chute cooperates with a feeder (not shown), of the conventional, automatically controlled type, which supplies measured gobs of glass.

The machine also comprises a pressing plunger 12 mounted on the frame of the machine and arranged directly above the cavity of the mould and centered relative to the latter. An automatically controlled hydraulic mechanism (not shown) enables the plunger to be lowered into the cavity of the mould in order to perform the moulding of the glass article, after which it raises the plunger. Naturally, the funnel/deflector chute assembly is located in the retracted position as the plunger is lowered. The machine additionally comprises a plurality of mould bases 13 distributed at regular intervals along an endless conveyor belt 14 mounted around two drums 15 and 15', one of which is driven stepwise at adjustable intervals of time by a motor (not shown). Thus, the belt is moved along periodically so that each of the mould bases successively closes the bottom opening defined by the two parts of the mould after the latter have been brought into the closed position in which they enclose the top of the mould base.

The machine also has cooling means consisting, firstly, of channels 16 for circulating a cooling fluid (for example water) which are provided in each of the parts 2 and 2' of the mould and connected to pipes (not shown) for supplying and draining off the said fluid, and to a pump (not shown), the operation of which is controlled automatically, and, secondly, of an air-blowing pipe 17 capable of being introduced into the cavity of the moulded article in the first position occupied by the mould base, after the moulded article has left the mould and while still malleable, and then extracted from the said article before the said base supporting the moulded article is advanced to the next position. To this end, the pipe 17 is mounted telescopically in another air-supplying pipe 18 and is moved in vertical translation by an automatically controlled device 19.

The machine lastly comprises an anvil 20 serving to support the mould base during pressing.

The operating cycle of this machine can be summarized as follows:
  when the parts 2 and 2' of the mould are open, a mould base 13 is brought to their bottom part, and then the parts 2 and 2' are closed onto the top of the base 13, which thus closes the bottom opening defined by the parts 2 and 2';
  when the pressing plunger 12 is in the raised position, the funnel/deflector chute assembly 9, 10 is brought above the top opening of the mould and a measured gob of glass is fed into the mould;
  the funnel/deflector chute assembly is then retracted rearwards, after which the plunger 12 is lowered into the cavity of the mould in order to carry out the moulding of the article, and then raised. A pulse of cooling fluid is then sent into the channels 16 of the parts 2 and 2' of the mould so as to cool the moulded article to a consistency where it can support itself while still being malleable. It should be noted that the cooling by means of fluid is carried out in pulses since it is necessary to avoid the presence of the fluid in the channels of the mould during moulding which would cool the glass or glass-ceramic too quickly and prevent correct pressing. Moreover, there would be a risk of an accident as a result of the fluid vaporizing in the channels brought to a high temperature. In certain cases, it is possible to send the pulse only on every second moulding cycle;
  the mould is subsequently opened and the conveyor belt 14 is advanced one step. In so doing, the belt moves the base 13 carrying the moulded article to a position situated directly below the air-blowing pipe 17. This pipe is then lowered into the cavity of the said article by means of the device 19 and air is blown into the article in order to cool it further. At the same time, a new mould base is brought into the moulding position and the cycle which has just been described begins again.

Each moulded article 21 is finally removed from the mould base supporting it when the said mould base comes into the vicinity of the drum 15'.

By way of non-limiting examples, a few operating parameters are shown below regarding a cycle of a machine for moulding cups according to the invention, with respect to two different types of glass:

|  | Glass | |
| --- | --- | --- |
|  | "Sunopal" | "Toucan" |
| Weight of the gob of glass | 165 g | 177 g |
| Temperature of the gob | 1115° C. | 1360° C. |
| Output of the machine | 9.2 to 11 cups/minute | 10.3 to 12 cups/minute |
| Resident time of the gob in the mould | 2.1 seconds | 1.5 seconds |
| Lowering speed of the plunger | 88 cm/second | 70 cm/second |
| Resident time of the plunger in the mould | 2.25 seconds | 1.33 seconds |
| Raising speed of the plunger | 38 cm/second | 28 cm/second |
| Indexing time (time taken by the belt 14 to advance one step) | 0.8 second | 0.8 second |
| Cooling period | 5.7 seconds | 5 seconds |
| Mould closing time | 5.0 seconds | 3.4 seconds |
| Water-cooling Conditions |  |  |
| Pulse frequency | 1 per cycle | 1 every 2 cycles |
| Pulse duration | 0.9 second | 1.5 seconds |
| Water pressure | approx. 1 bar | approx. 1 bar |

As can be seen, the output of a machine according to the invention is in the region of 9 to 12 cups per minute. It is possible therefore to achieve, with 3 or 4 machines according to the invention, i.e., 3 or 4 moulds, an output equivalent to that of a conventional machine in use today, which has a far greater number of moulds. It is possible therefore to achieve lower production costs.

It is obvious that the embodiment described is only an example and is open to modification, in particular by substituting equivalent techniques, without thereby departing from the scope of the invention.

We claim:

1. An automatic machine for moulding glass articles by means of pressing, comprising a single split mould, means for opening and closing the mould, means for introducing a metered batch of molten glass into the said mould when the latter is in the closed position, pressing means in order to shape the batch of molten glass introduced into the said mould to the form of the said mould, and means for taking the shaped glass article away from the mould after opening of the latter, characterized in that the mould has two main parts capable of being brought into a closed or open position and intended to shape, in cooperation with the pressing means, the article to be moulded, with the exception of the base thereof, and means for periodically cooling the said main parts at least at certain locations thereof, using a pulse of cooling fluid, and in that it additionally comprises a plurality of mould bases capable of being brought successively into a position in which they complete the said mould after the said main parts have been brought into the closed position, the said mould bases additionally serving to take away the still malleable glass article having just been moulded, after opening of the mould and to support the said glass article until it has reached a degree of cooling such that it can be manipulated without risk of deformation.

2. A machine according to claim 1, characterized in that it additionally comprises air cooling means capable of blowing air into the cavity of the moulded article after opening of the mould.

* * * * *